United States Patent
Smith et al.

(10) Patent No.: US 7,734,363 B1
(45) Date of Patent: *Jun. 8, 2010

(54) TECHNIQUE FOR INDEPENDENT GROUND FAULT DETECTION OF MULTIPLE TWISTED PAIR TELEPHONE LINES CONNECTED TO A COMMON ELECTRICAL POWER SOURCE

(75) Inventors: Scott L. Smith, Madison, AL (US); Steven M. Robinson, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 1143 days.

This patent is subject to a terminal disclaimer.

(21) Appl. No.: 11/359,077

(22) Filed: Feb. 22, 2006

Related U.S. Application Data

(62) Division of application No. 10/760,996, filed on Jan. 20, 2004, now Pat. No. 7,508,930.

(51) Int. Cl.
*H04M 1/00* (2006.01)
(52) U.S. Cl. .................................. 700/94; 379/399.01
(58) Field of Classification Search ............ 379/395.01, 379/399.01, 412, 413
See application file for complete search history.

(56) References Cited

U.S. PATENT DOCUMENTS

| | | | | |
|---|---|---|---|---|
| 4,385,336 | A | * | 5/1983 | Takeshita et al. ......... 379/29.03 |
| 7,508,930 | B2 | * | 3/2009 | Smith et al. ............ 379/395.01 |
| 2004/0240665 | A1 | | 12/2004 | Phillips et al. .............. 379/413 |

* cited by examiner

*Primary Examiner*—Walter F Briney, III
(74) *Attorney, Agent, or Firm*—Allen, Dyer, Doppelt, Milbrath & Gilchrist, P.A.

(57) ABSTRACT

A method and apparatus detects a ground fault on a span-powered telecommunication wireline within a plurality of span-powered wireline segments, to respective ones of which DSL-Cs are coupled, so that a ground fault may be detected when power is delivered by the DSL-C over a respective wireline segment to a respective downstream functional RT. A respective DSL-C measures a first voltage across a first sense resistor representative of current flowing in a first portion of its wireline segment to the RT, and also measures a second voltage across a second sense resistor representative of current flowing in a second portion of the wireline segment from the RT. In response to a difference in the first and second voltages an output representative of a ground fault in that wireline segment is generated.

6 Claims, 4 Drawing Sheets

TECHNIQUE FOR INDEPENDENT GROUND FAULT DETECTION OF MULTIPLE TWISTED PAIR TELEPHONE LINES CONNECTED TO A COMMON ELECTRICAL POWER SOURCE

CROSS-REFERENCE TO RELATED APPLICATION

The present application is a divisional application of U.S. patent application Ser. No. 10/760,996, filed on Jan. 20, 2004, now U.S. Pat. No. 7,508,930 entitled "Technique For Independent Ground Fault Detection Of Multiple Twisted Pair Telephone Lines Connected To A Common Electrical Power Source", assigned to the assignee of the present application, and the disclosure of which is incorporated herein.

FIELD OF THE INVENTION

The present invention relates in general to electrical power systems and subsystems of the type used for span-powering multiple telecommunication equipments, and is particularly directed to a new and improved ground fault detection and isolation scheme for use with multiple electrical loads (transceivers), that are connected by way of respectively different wireline links to a common power source installed at a facility such as a central office.

BACKGROUND OF THE INVENTION

Local Exchange Carriers (LECs) within the telecommunication industry have implemented a variety of digital transmission systems to service their customers. As diagrammatically illustrated in FIG. 1, a typical digital transmission system may contain a first (network or central office site-associated) transceiver unit 10 that is coupled to a first (e.g., central office) end 21 of a single twisted pair of telephone wires (or span) 20, and a second (remote site-associated) transceiver unit 30 coupled to a remote end 22 of the twisted pair 20. Also, the central office transceiver unit 10 may be equipped to supply electrical power over twisted pair 20 to remote transceiver 30.

In such a 'span-powered' configuration, it is often desirable for multiple central office transceiver units to derive span power for their respective remote transceiver units from a common or shared electrical power source. When a system incorporates span-powering of multiple remote units from a common electrical power source, there is the possibility that any individually span-powered twisted pair telephone line may incur an insulation failure—resulting in an electrical current path to earth. This electrical current path to earth is known as a 'ground fault' and a person's body can serve as this path. A ground faulted telephone line can present a hazardous voltage condition to service personnel and can interrupt normal power source operation, which results in transceiver malfunction on all of the connected twisted pair telephone lines.

Hazardous voltage, power source interruption and resulting multiple transceiver malfunction are unacceptable network conditions. If the particular twisted pair telephone line that is ground-faulted can be identified, then that particular line can be isolated from the power source and the remaining multiple span-powered twisted pair telephone lines and associated transceivers can continue normal operation and the hazardous voltage can be isolated.

SUMMARY OF THE INVENTION

The present invention is directed to a methodology and subsystem architecture for detecting the occurrence of a ground fault in a multiple, span-powered telecommunication network and then identifying which particular span segment or twisted pair telephone line is ground faulted. For this purpose, the ground fault detection circuit may be installed within a respective Digital Subscriber Line—Central Office Terminal (DSL-C), so that a ground fault may be detected when power is delivered by the DSL-C to a respective downstream functional Remote Terminal (RT).

By 'ground fault' is meant that one or both conductors of a span-powered twisted pair are connected to earth by a low or zero ohm impedance, which is capable of causing the DSL-C to supply electrical current in excess of normal load current. If this should happen without detecting and isolating the faulted twisted pair, the span power bus voltage would be reduced to a level such that the other RT units would not operate properly and cause data errors on the digital subscriber line. As will be detailed below, this problem is effectively obviated in accordance with the invention by using the ground fault detect circuit to identify and initiate disconnecting and isolating the particular faulted twisted pair. The disconnect and isolation circuitry for each individual span power bus segment is incorporated in the DSL-C units and interfaces with the ground fault detect circuit.

In order to detect a ground faulted twisted pair line, there must be some way of detecting the flow of current in the earth/ground connection. Although this could be accomplished at the electrical power source simply by measuring or detecting current in the conductor that connects the electrical power source to earth, such a method does not identify which twisted pair line is ground faulted. Some method for detecting ground fault current and identifying which line is ground faulted is required. The underlying principle of operation of a ground fault current detector circuit which identifies the ground faulted twisted pair line in accordance with the present invention is illustrated in the reduced complexity schematic diagram of FIG. 2.

As shown therein, V1 is the electrical power source that corresponds to the span power bus 210 of a multi powered span network of FIG. 3, which corresponds to a span-powered HDSL2 telecommunication system in which the present invention may be employed. The system of FIG. 3 includes an arbitrary plurality (two being shown to reduce the complexity of the drawing) of functional DSL-Cs 200-1, . . . , 200-N. These units conduct DSL communications over, and receive their electrical power by way of, a span powered bus 210 from a common electrical power source 220. In accordance with the invention, within each DSL-C, span power from source 220 is processed by a ground fault detection circuit 201-$i$ (to be described), prior to being delivered to a respective downstream functional RT 230-$i$, which presents a capacitive input constant power load. The ground fault detection circuit 201-$i$ in a respective DSL-C unit 200-$i$ provides ground fault detection for the individual twisted pair.

In the reduced complexity schematic of FIG. 2, resistors R1sense and R2sense are main parts in the ground fault detect circuit in the DSL-C, and resistor Rload corresponds to the RT 230-$i$. Resistors R1fault and R2fault represent possible ground fault current paths. The resistors R1sense and R2sense are current sensing resistors such that the voltage magnitude across these resistors is directly proportional to the magnitude of the current through the resistors and is given in equations (1) and (2) as:

$$VR1sense = I1 \times R1sense \quad (1)$$

$$VR2sense = I2 \times R2sense \quad (2)$$

The magnitude of the ground fault current is determined by sensing and processing the magnitude of current in both of the current sensing resistors. The magnitude of the ground fault current Ifault is given in equation (3) by:

$$Ifault = I1 - I2 \quad (3)$$

Which particular twisted pair line is ground faulted can be identified by implementing the ground fault current detect circuit on each twisted pair line. In addition, circuitry is provided which performs the mathematical function of finding the difference between I1 and I2, which is equal to Ifault. This is accomplished by finding the difference between two voltages that are directly proportional to currents I1 and I2. In this case the two voltages must be ground-referenced and must be derived using only one ground-referenced bias power supply.

Deriving a precision ground-referenced voltage using one bias supply (that is directly proportional to current I1) is not straightforward because of the high common mode voltage present at R1sense. Derivation is accomplished in accordance with the present invention by a composite circuit, a first differential amplifier-based section of which produces a first output voltage Vo1 across a resistor that is directly proportional to the current I1 flowing in the sense resistor R1sense of the schematic of FIG. 2. As will be described this first output voltage Vo1 has an offset voltage needed for a single bias supply design to maintain a first amplifier's output voltage at a non-zero value when the current I1 is zero. A slope value of the transfer function for the first output voltage is chosen to yield a maximum output voltage value Vo1 when I1 is at a maximum value.

A second differential amplifier-based section of the composite circuit produces a second output voltage V02, that is directly proportional to the current I2 flowing in the sense resistor R2 sense of the schematic of FIG. 2. As in the first section, an offset voltage is employed for a single bias supply design to keep the amplifier output voltage at a non-zero value when the current I1 is zero. A slope value is chosen to yield a maximum output voltage value V02 when the current I2 is at a maximum value.

Circuit resistor values are chosen so that the output voltages of the first and second circuit sections are equal when the currents I1 and I2 are equal. This is accomplished my making the slope and offset of the two output voltage transfer functions equal. When there is a mathematical difference in the two current sense circuit output voltages, then currents I1 and I2 are not equal, which indicates that ground fault current is flowing. A difference circuit is used to provide an output voltage Vo that is proportional to the mathematical difference in the two current sense circuit output voltages. The output of the difference circuit is the output of the ground fault detect circuit and moves either positive or negative, depending on whether the fault current is flowing in resistor R1fault or resistor R2fault. This output is coupled as an input to circuitry that is operative to isolate the faulted twisted pair telephone line in response to detection of a fault current.

DETAILED DESCRIPTION

Figure 1:
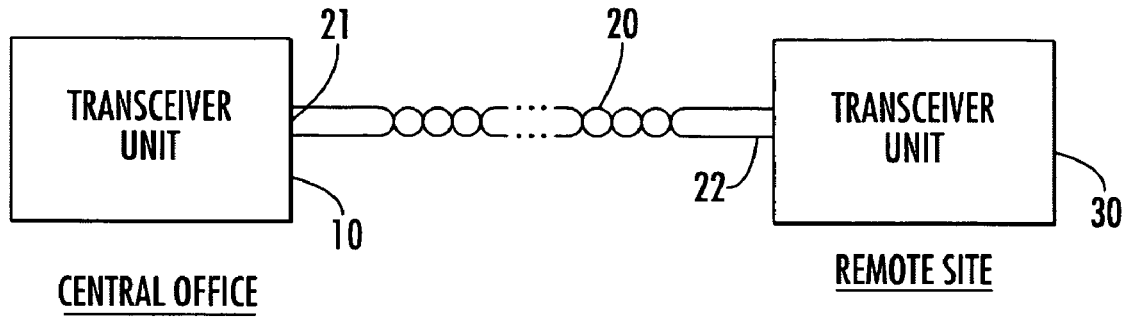
FIG. 1 diagrammatically illustrates a typical (reduced complexity) digital transmission system.

Before detailing the inventive scheme for isolating a ground fault within a multiple span powered system, wherein different electrical loads are connected by way of respective wireline segments to a common electrical power source, it should be observed that the invention resides primarily in a prescribed arrangement of conventional communication circuits and components, and control circuitry that controls the operations of such circuits and components. Consequently, in the drawings, the configuration of such circuits and components, and the manner in which they may be interfaced with various telecommunication circuits have, for the most part, been illustrated by readily understandable block diagrams, which show only those specific details that are pertinent to the present invention, so as not to obscure the disclosure with details which will be readily apparent to those skilled in the art having the benefit of the description herein. Thus, the block diagrams of the Figures are primarily intended to show the various components of the invention in convenient functional groupings, so that the present invention may be more readily understood.

Figure 2:
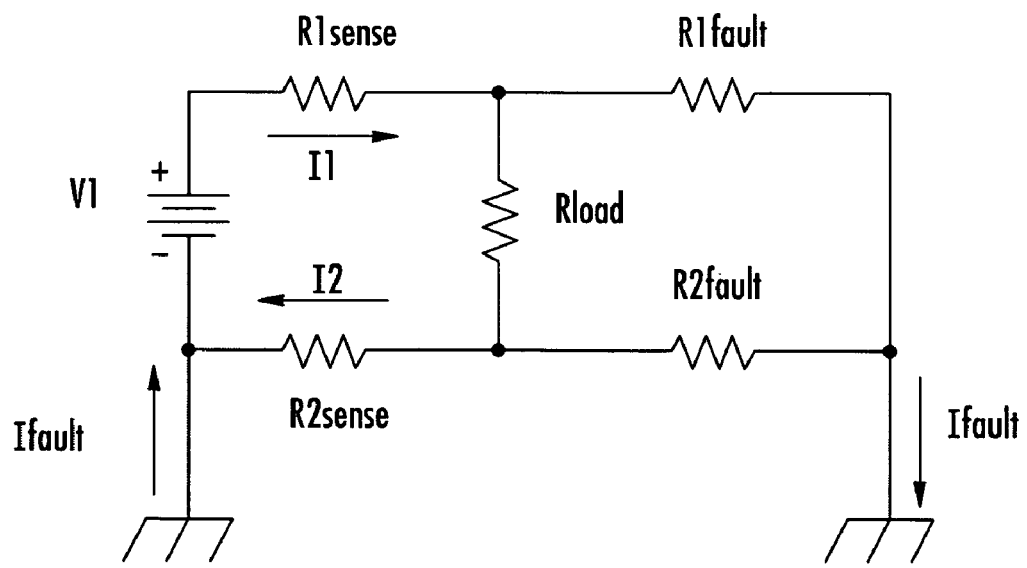
FIG. 2 is a reduced complexity schematic diagram of a span powered network showing faults across a load to ground.
Figure 3:
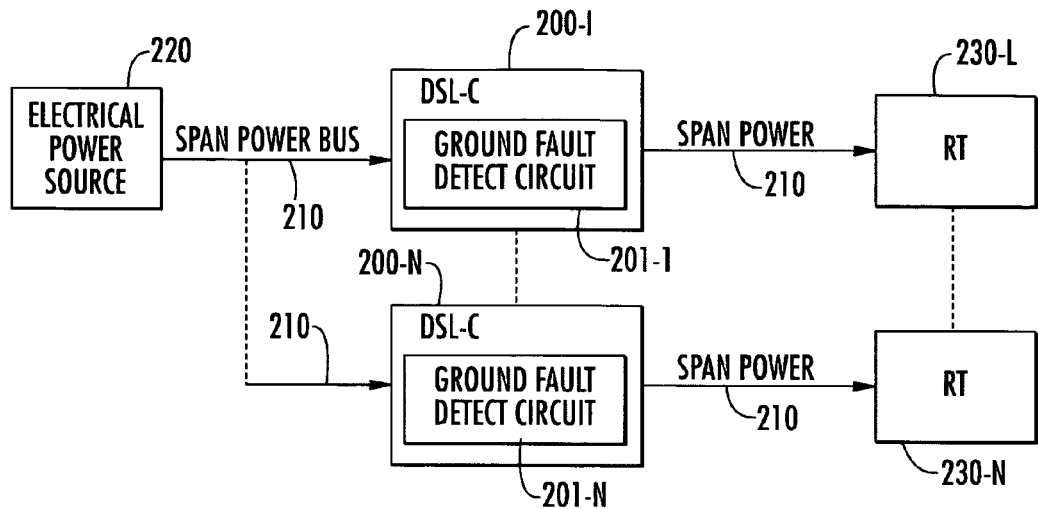
FIG. 3 diagrammatically illustrates the general architecture of a span-powered High bit rate Digital Subscriber Line—Second Generation (HDSL2) telecommunication system in which the present invention may be employed.
Figure 4:
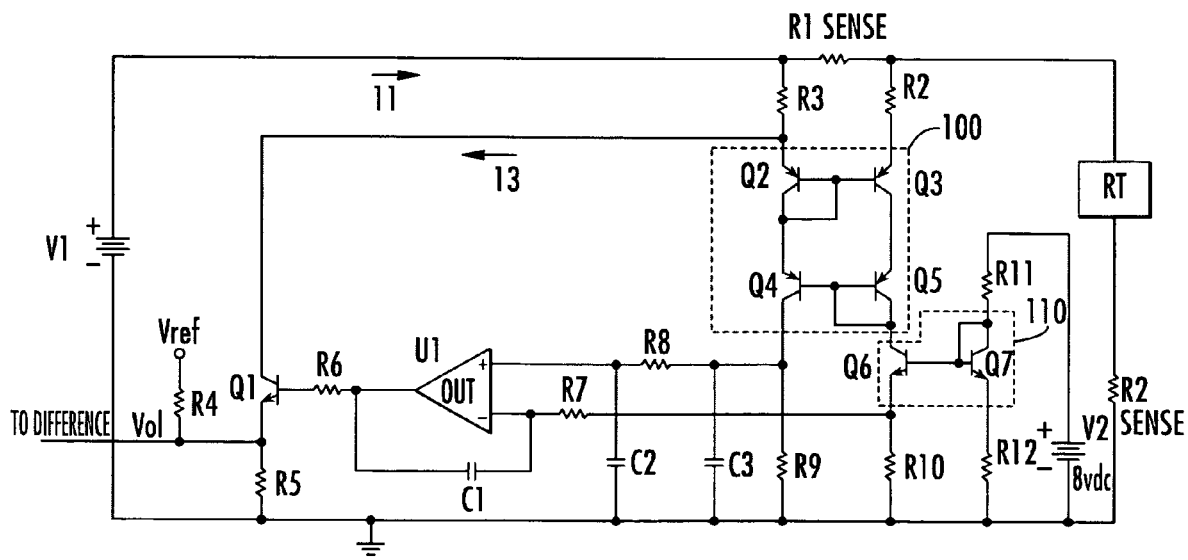
FIG. 4 is a schematic diagram of a circuit that is operative to produce an output voltage across a resistor that is directly proportional to the current I1 flowing in the sense resistor R1sense of the schematic of FIG. 2.

Attention is now directed to FIG. 4 which is a schematic diagram of a circuit that is operative to produce an output voltage across a resistor that is directly proportional to the current I1 flowing in the sense resistor R1sense, which corresponds to the sense resistor R1sense of the schematic of FIG. 2. More particularly, FIG. 4 shows current flow path I1 proceeding from a power source V1(+), which is referenced to ground, through a sense resistor R1sense to the load (RT). The return path from the load is through a sense resistor R2sense to V1(−). Coupled to either end of sense resistor R1sense are equal valued resistors R2 and R3 in respective legs of a current mirror circuit 100 comprised of bipolar transistors Q2 and Q3 and bipolar transistors Q4 and Q5, as shown. A reference current for the current mirror circuit is supplied by a further current mirror circuit 110 containing transistors Q6 and Q7, that have their emitters coupled to V1(−) via same valued resistors R10 and R12. Transistor Q7 has its collector path referenced through resistor R11 to a supply V2. The collector of transistor Q4 is coupled to V1(−) through resistor R9 of like value to resistors R10 and R12.

The collector of current mirror transistor Q4 and the emitter of current mirror transistor Q6 are coupled through respective resistors R8 and R7 to the non-inverting (+) and inverting (−) inputs 121 and 122 of differential amplifier U1. Capacitors C2 and C3 couple opposite ends of resistor R8 to ground, while a feedback capacitor C1 is coupled between the output of amplifier U1 and its inverting input. The output of amplifier U1 is further coupled through resistor R6 to the base of transistor Q1, which has its collector-emitter current flow path for a current I3 coupled between current mirror 100 and resistor R5 coupled to ground. A pull-up resistor R4 is coupled to a reference voltage Vref from the emitter of transistor Q1. The emitter of transistor Q1 provides an output voltage Vo1 as follows.

The current I1 flows through resistor R1sense and generates a voltage V(R1sense) across resistor R1sense as set forth in equation (4):

$$V(R1sense)=I1\times R1sense \quad (4)$$

Summing the voltages around the loop that contains R1sense, resistors R2 and R3 and the base-emitter paths through transistors Q2 and Q3, and recognizing that the two base-emitter voltages of transistors Q2 and Q3 mutually cancel produces equation (5) as:

$$V(R1sense)+V(R2)=V(R3) \quad (5)$$

Since transistors Q2 and Q3 form a current mirror, their emitter currents are equivalent and in this case are equal to I(R2). The current I(R3) is larger than the current I(R2), because V(R3) is greater than V(R2). Since the emitter currents of transistors Q2 and Q3 are equivalent, a portion of the current I(R3) must flow through the current flow path I3 to transistor Q1. If current I1 is zero, then V(R3) is equal to V(R2). If current I1 is non-zero, then V(R3) is the sum of V(R1sense) and V(R2). The current I3 creates a voltage drop in resistor R3 that is equal to V(R1sense), so that V(R3) will increase to equal V(R1sense)+V(R2), such that $$I3=V(R1sense)/R3 \quad (6)$$

The current I3 is directly proportional to V(R1sense), which is directly proportional to current I1. With transistor Q1 conducting, the current I3 flows through resistor R5 and a DC offset is created by Vref and R4 to create a voltage Vo1 in accordance with the transfer function (7):

$$Vo1=m\times I3+b \quad (7)$$

where $$m=(R4\times R5)/(R4+R5) \quad (8)$$ and $$b=Vref\times R5/(R4+R5) \quad (9)$$

Substituting for the current I3, the overall translation of input current to output voltage Vo1 may be defined in equation (10) as:

$$Vo1=I1\times R1sense/R3\times (R4\times R5)/(R4+R5)+Vref\times R5/(R4+R5) \quad (10)$$

This yields a voltage Vo1 that is directly proportional to the input current I1. The offset voltage b is needed for a single bias supply design to maintain the amplifier output voltage at a non-zero value when current I1 is zero. The value m in equation (11) is chosen to yield a maximum output voltage value Vo1 when I1 is at a maximum value.

$$m=R1sense/R3\times (R4\times R5)/(R4+R5) \quad (11)$$

Figure 5:
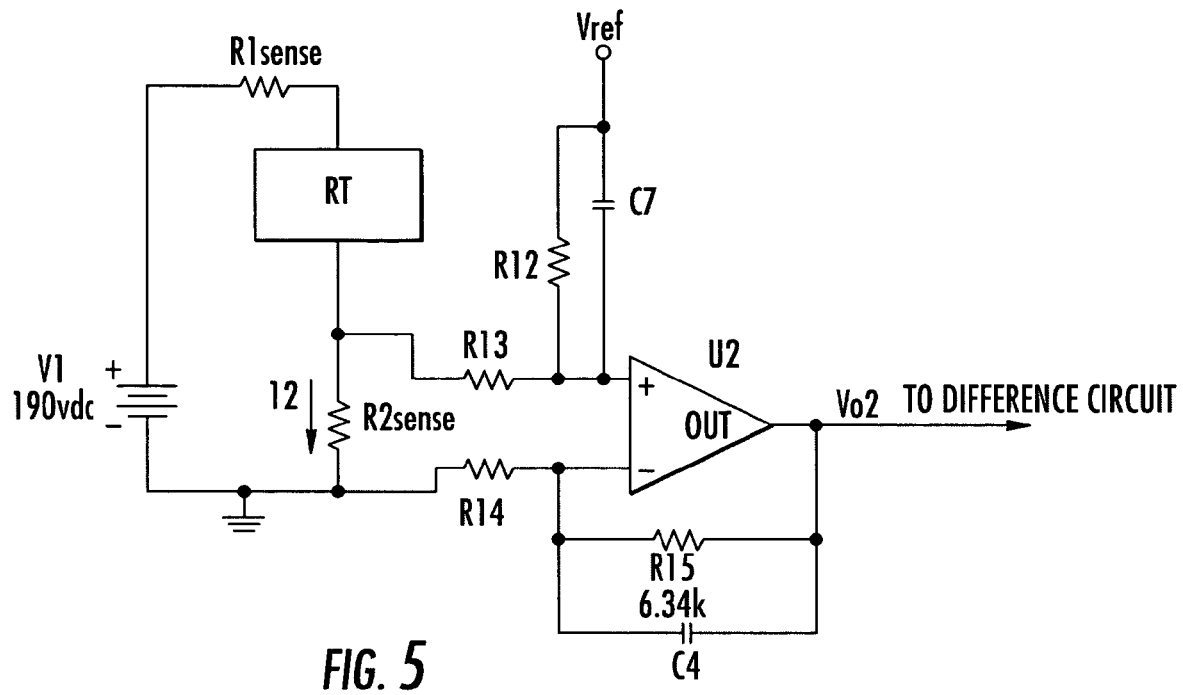
FIG. 5 is a schematic diagram of a circuit that will produce a voltage directly proportional to I2 in the sense resistor R2sense of the schematic of FIG. 2.

A circuit that will produce a voltage directly proportional to I2 is shown in FIG. 5. In particular, proceeding from the right hand portion of the circuit shown in FIG. 4, respective resistors R13 and R14 are coupled between opposite ends of the sense resistor R2sense and the non-inverting (+) and inverting (−) inputs 131 and 132 of differential amplifier U2. The non-inverting (+) input 131 of amplifier U2 is further coupled to Vref via resistor R12 and a capacitor C7, while the output of amplifier U2 is coupled through resistor R15 and capacitor C4 to the inverting (−) input 132 of amplifier U2. The output of amplifier U2 produces the voltage V02 that is proportional to the current I2 through sense resistor R2sense.

In particular the amplifier circuit of FIG. 5 has the transfer function:

$$Vo2=m\times I2+b \quad (12)$$

where m=chosen constant gain term $$m=R2sense\times \{R12/(R12+R13)\}\times \{(R14+R15)/R14\} \quad (13)$$ and b=chosen minimum DC output voltage.

This yields a voltage V02 at the output of amplifier U2 that is directly proportional to input current I2. The offset voltage b is needed for a single bias supply design to keep the amplifier output voltage at a non-zero value when current I1 is zero. The value m is chosen to yield a maximum output voltage value V02 when the current I2 is at a maximum value.

Circuit resistor values are chosen so that the output voltage of the upper and lower current sense circuits are equal when the currents I1 and I2 are equal. This is accomplished my making m and b of the two transfer functions equal. When there is a mathematical difference in the two current sense circuit output voltages, then currents I1 and I2 are not equal, which indicates that a ground fault current is flowing. A difference circuit that will provide an output voltage Vo that is proportional to the mathematical difference in the two current sense circuit output voltages is shown in FIG. 6.

As shown therein input ports 141 and 142 are coupled to receive the voltages V01 and V02 produced by the circuits of FIGS. 4 and 5, respectively. What results is the composite schematic diagram shown in FIG. 7. With respect to the difference circuit of FIG. 6, input port 141 is coupled through resistor R18 to the inverting (−) input 151 of differential amplifier U3, while input port 142 is coupled through resistor R17 to the non-inverting (+) input 152 of differential amplifier U3. The non-inverting (+) input 142 of amplifier U3 is further coupled to Vref via resistor R16 and a capacitor C5, while the output of amplifier U3 is coupled through resistor R19 and capacitor C6 to the inverting (−) input 151 of amplifier U3. The output of amplifier U2 produces a voltage V0 that is proportional to the difference between its two input voltages V01 and V02 as follows.

Figure 6:
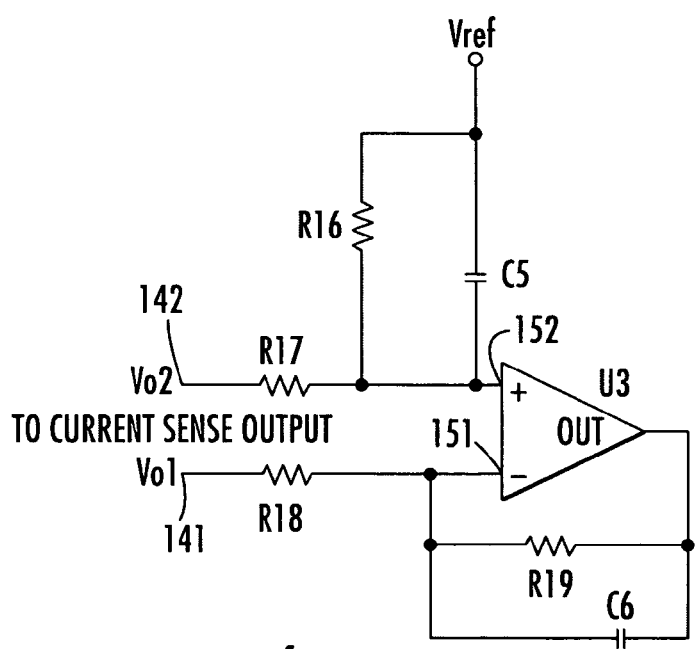
FIG. 6 is a schematic diagram of a difference circuit that will provide an output voltage V0 proportional to the mathematical difference in the two current sense circuit output voltages of the circuits of FIGS. 4 and 5.
Figure 7:
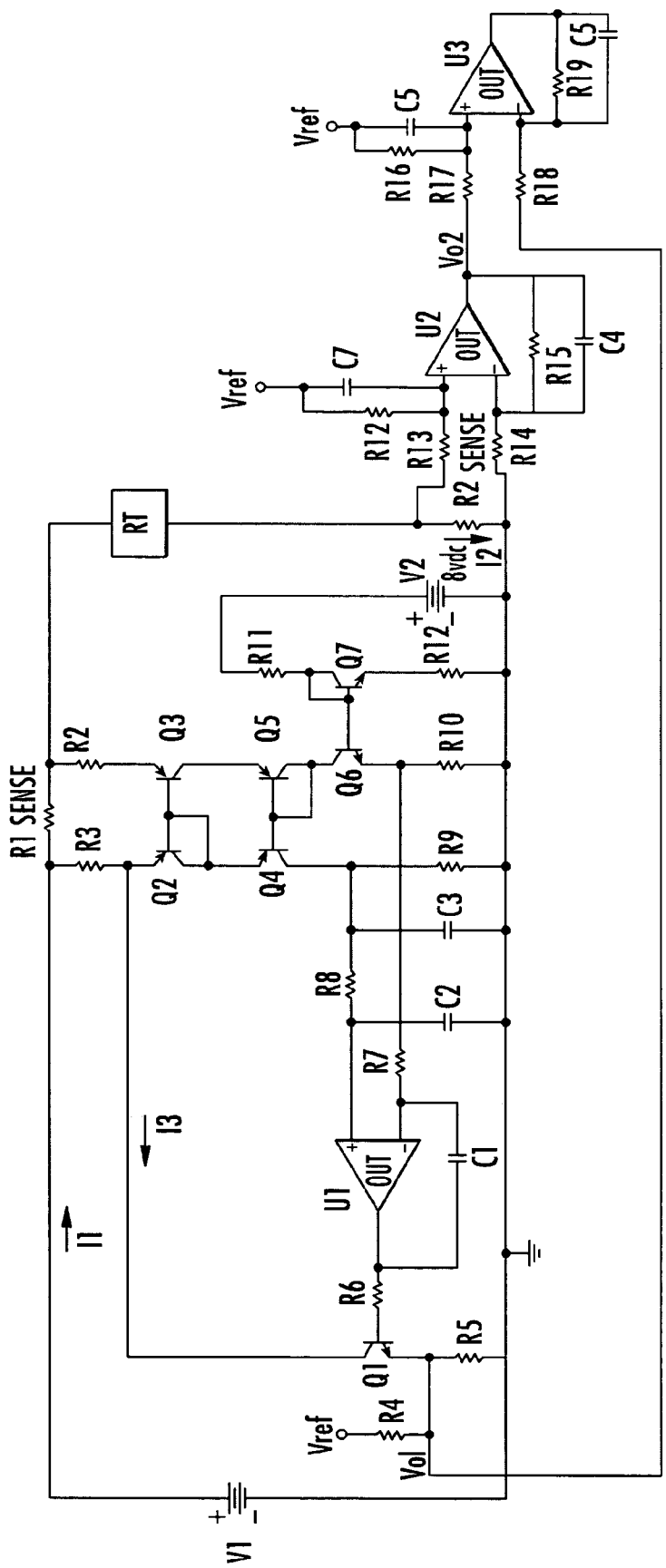
FIG. 7 is a composite circuit diagram containing the circuit portions of FIGS. 4, 5 and 6.

The differential amplifier circuit of FIG. 6 has the function defined by $$Vo=(Vo1-Vo2)\times (R19/R18)+b \quad (14)$$

where Vo1 and V02 are defined above, and b=Vref

Resistor values R19 and R18 are chosen based on the desired output voltage versus fault current amplitude, and b is chosen as an output DC level, to indicate no difference in input voltage, or no fault current flowing. The output of the difference circuit of FIG. 6 is the output of the ground fault detect circuit and moves either positive or negative, depending on whether the fault current is flowing in resistor R1fault or resistor R2fault. This output is coupled as an input to circuitry that is operative to isolate the faulted twisted pair telephone line in response to detection of a fault current.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of delivering span power by way of a plurality of telecommunication wireline segments to respective ones of a plurality of remote telecommunication terminals, said method comprising the steps of:
   (a) coupling said plurality of telecommunication wireline segments to a span power bus, so that span power is coupled from said span power bus to said plurality of telecommunication wireline segments;
   (b) coupling respective ones of said plurality of telecommunication wireline segments to respective ones of said plurality of remote telecommunication terminals, so that said span power is delivered by said plurality of telecommunication wireline segments to said respective ones of said plurality of remote telecommunication terminals;
   (c) coupling respective ones of said plurality of telecommunication wireline segments to respective ones of a plurality of ground fault detection and isolation circuits, a respective ground fault being capable of causing electrical current in excess of normal load current to flow in a remote telecommunication terminal that is connected to the respective telecommunication wireline segment in which the ground fault has occurred, and causing a reduction in said span power to a level that prevents proper operation of a remote telecommunication terminal that is coupled to a telecommunication wireline segment in which no ground fault has occurred;
   (d) causing said ground fault detection and isolation circuits to monitor said plurality of telecommunication wireline segments for the occurrence of a ground fault therein; and
   (e) in response to a ground fault detection and isolation circuit detecting, in step (d), the occurrence of a ground fault in an associated telecommunication wireline segment to which said ground fault detection and isolation circuit is coupled, causing said ground fault detection and isolation circuit to decouple and isolate said associated telecommunication wireline segment from said span power bus, so as to prevent said reduction in said span power being delivered by others of said plurality of telecommunication wireline segments, in which no ground fault has been detected as having occurred, to remote telecommunication terminals coupled thereto, thereby preventing misoperation of said remote telecommunication terminals coupled to said others of said plurality of telecommunication wireline segments.

2. The method according to claim 1, wherein step (e) further comprises, in response to said ground fault detection and isolation circuit failing to detect the occurrence of a ground fault on said associated telecommunication wireline segment in step (d), causing said ground fault detection and isolation circuit to maintain said associated telecommunication wireline segment coupled with said span power bus and thus deliver said span power to a remote telecommunication terminal coupled to said associated telecommunication wireline segment, so that normal load current may be supplied to said remote telecommunication terminal.

3. A method of delivering power, applied from an electrical power source to a span power bus, by way of a plurality of telecommunication wireline segments to respective ones of a plurality of remote telecommunication terminals, said method comprising the steps of:
   (a) coupling first portions of said plurality of telecommunication wireline segments to said span power bus, so that power is coupled from said span power bus to said first portions of said plurality of telecommunication wireline segments;
   (b) coupling second portions of said plurality of telecommunication wireline segments to said respective ones of said plurality of remote telecommunication terminals, so that power coupled from said span power bus to said first portions of said plurality of telecommunication wireline segments is delivered by said second portions of said plurality of telecommunication wireline segments to said respective ones of said plurality of remote telecommunication terminals;
   (c) coupling the first and second portions of respective ones of said plurality of telecommunication wireline segments to respective ones of a plurality of ground fault detection and isolation circuits;
   (d) causing each ground fault detection and isolation circuit to monitor the respective telecommunication wireline segment to which said each ground fault detection and isolation circuit is coupled for the occurrence of a ground fault; and
   (e) in response to a respective ground fault detection and isolation circuit detecting the occurrence of a ground fault on said respective telecommunication wireline segment in step (d), causing said respective ground fault detection and isolation circuit to perform the operation of decoupling, and thereby isolating, said respective telecommunication wireline segment from said span power bus, said operation being effective to prevent a change in the power being delivered by others of said plurality of telecommunication wireline segments to remote telecommunication terminals coupled thereto, and thereby prevent misoperation of said remote telecommunication terminals coupled to said others of said plurality of telecommunication wireline segments.

4. The method according to claim 3, wherein step (e) further comprises, in response to said respective ground fault detection and isolation circuit detecting the absence of a ground fault on said respective telecommunication wireline segment in step (d), causing said respective ground fault detection and isolation circuit to maintain said telecommunication wireline segment coupled with said span power bus, and thereby deliver power from said span power bus to a remote telecommunication terminal coupled to said telecommunication wireline segment, so that normal load current may be supplied to said remote telecommunication terminal.

5. A system for controlling delivery of span power supplied by a span power bus to respective ones of a plurality of remote telecommunication terminals, said system comprising:
   a plurality of telecommunication wireline segments coupled to said span power bus, so that span power is coupled from said span power bus to said plurality of telecommunication wireline segments, respective ones of said plurality of telecommunication wireline segments being coupled to respective ones of said plurality of remote telecommunication terminals, so that said span power is delivered by said plurality of telecommunication wireline segments to said respective ones of said plurality of remote telecommunication terminals; and
   a plurality of ground fault detection and isolation circuits, coupled with respective ones of said plurality of telecommunication wireline segments between said span power bus and said plurality of remote telecommunication terminals, and being operative to monitor respective ones of said plurality of telecommunication wireline segments for the occurrence of a ground fault therein, a ground fault being capable of presenting a hazardous voltage condition to service personnel, causing electrical current in excess of normal load current to flow in a remote telecommunication terminal that is connected to the respective telecommunication wireline segment in which the ground fault has occurred, as well as producing a reduction of normal span power supplied by said span power bus and said telecommunication wireline segments, causing remote telecommunication terminals to malfunction; and wherein a respective ground fault detection and isolation circuit is operative, in response to detecting the occurrence of a ground fault in an associated telecommunication wireline segment to which said respective ground fault detection and isolation circuit is coupled, to decouple and isolate said associated telecommunication wireline segment from said span power bus, so as to prevent said reduction in said span power being delivered by others of said plurality of telecommunication wireline segments, in which no ground fault has been detected as having occurred, to remote telecommunication terminals coupled thereto, thereby preventing misoperation of said remote telecommunication terminals coupled to said others of said plurality of telecommunication wireline segments.

6. The system according to claim 5, wherein said respective ground fault detection and isolation circuit is further operative, in response to failing to detect the occurrence of a ground fault in said associated telecommunication wireline segment, to maintain said associated telecommunication wireline segment coupled with said span power bus and thus maintain delivery of said span power by said associated telecommunication wireline segment to a remote telecommunication terminal coupled thereto, so that normal load current may be supplied to said remote telecommunication terminal.

* * * * *